(12) United States Patent　　(10) Patent No.: US 11,165,588 B1
Visegrady et al.　　　　　　　　(45) Date of Patent: Nov. 2, 2021

(54) KEY ATTRIBUTE VERIFICATION

(71) Applicant: International Business Machines Corporation, Armonk, NY (US)

(72) Inventors: Tamas Visegrady, Zurich (CH); Silvio Dragone, Olten (CH); Michael Charles Osborne, Richterswil (CH); Elaine R. Palmer, Hanover, NH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/843,980

(22) Filed: Apr. 9, 2020

(51) Int. Cl.
　　*H04L 29/06*　　(2006.01)
　　*H04L 9/32*　　(2006.01)
　　*H04L 9/08*　　(2006.01)

(52) U.S. Cl.
　　CPC ............ *H04L 9/3242* (2013.01); *H04L 9/083* (2013.01); *H04L 9/0866* (2013.01); *H04L 9/0897* (2013.01)

(58) Field of Classification Search
　　CPC ..... H04L 9/3242; H04L 9/083; H04L 9/0866; H04L 9/0897; H04L 2209/38; H04L 9/14; H04L 2209/127; G06F 21/72; G06F 21/602
　　See application file for complete search history.

(56) References Cited

U.S. PATENT DOCUMENTS

| | | |
|---|---|---|
| 9,530,011 B2 | 12/2016 | French |
| 9,967,289 B2 | 5/2018 | White |
| 10,296,765 B2 | 5/2019 | Dragone |
| 10,305,870 B2 | 5/2019 | Khazan |
| 2007/0185814 A1 | 8/2007 | Boccon-Gibod |

(Continued)

FOREIGN PATENT DOCUMENTS

| | | |
|---|---|---|
| CN | 107888548 A | 4/2018 |
| CN | 110740016 A | 1/2020 |
| WO | 2008125056 A1 | 10/2008 |

OTHER PUBLICATIONS

"Advanced Security Mechanisms for Machine Readable Travel Documents and eIDAS Token—Part 2: Protocols for electronic IDentification, Authentication and trust Services (eIDAS)", Technical Guideline TR-03110, Version 2.21, 21. Dec. 2016, 35 pages.

(Continued)

*Primary Examiner* — Yogesh Paliwal
(74) *Attorney, Agent, or Firm* — Brian M. Restauro

(57) ABSTRACT

A key identifier that identifies a cryptographic key is transmitted to a cryptographic coprocessor. A first set of attributes is received from the cryptographic coprocessor. The first set of attributes and a second set of attributes are serialized into a first sequence of attributes. The first sequence of attributes are stored to an attribute frame. One or more attributes in the second set of attributes are associated with the cryptographic key and originate from a key attribute storage of the key management system. The second set of attributes is different from the first set of attributes. The first sequence of attributes is transmitted to the cryptographic coprocessor. A first message authentication code (MAC) calculated from the first sequence of attributes is received from the cryptographic coprocessor. The attribute frame is verified by comparing the first MAC, or a value derived from the first MAC, to a reference value.

20 Claims, 7 Drawing Sheets

(56) References Cited

U.S. PATENT DOCUMENTS

| | | | |
|---|---|---|---|
| 2010/0031021 A1* | 2/2010 | Arnold | H04L 9/3242 713/155 |
| 2012/0314854 A1 | 12/2012 | Waters | |
| 2014/0082364 A1* | 3/2014 | Cucinotta | H04L 9/0825 713/171 |
| 2019/0007202 A1* | 1/2019 | Colombo | G06F 13/36 |

OTHER PUBLICATIONS

"Advanced Security Mechanisms for Machine Readable Travel Documents and eIDAS Token—Part 3: Common Specifications", Technical Guideline TR-03110, Version 2.21, 21. Dec. 2016, © Federal Office for Information Security 2016.

"Cryptosense", Master your Cryptographic Infrastructure, PKCS#11 v2.20 Compliance Criteria, © Cryptosense 2015, V1.01, 12 pages.

"Known Issues", Printed Feb. 19, 2020, 7 pages, <https://docs.aws.amazon.com/cloudhsm/latest/userguide/KnownIssues.html>.

"Machine Readable Travel Documents", Guidance Document, PKI for Machine Readable Travel Documents, Version—1.0 Date—Jun. 22, 2011, 24 pages.

"Migration Path D-HSM eID v1 to CSe eID v2", Utimaco, Printed Feb. 19, 20,1 page, <https://myrscs.rohde-schwarz.com/confluence/display/CKB/Migration+Path+D-HSM+eID+v1+to+CSe+eID+v2>.

"PKCS #11 Cryptographic Token Interface Base Specification Version 2.40", OASIS Standard, Apr. 14, 2015, Copyright © OASIS Open 2015, 149 pages.

"Public Key Cryptography for the Financial Services Industry The Elliptic Curve Digital Signature Algorithm (ECDSA)", Copyright © 2005 by Accredited Standards Committee X9, Inc., 163 pages.

Barker et al., "A Profile for U.S. Federal Cryptographic Key Management Systems (CKMS)", NIST Special Publication 800-152, Oct. 2015,147 pages, <http://dx.doi.org/10.6028/NIST.SP.800-152>.

Clulow, Jolyon, "On the Security of PKCS 11", University of Natal, Department of Mathematical and Statistical Sciences, Durban, South Africa, © Springer-Verlag Berlin Heidelberg 2003, 15 pages.

Kowalski, Bernd "Certification Report", Federal Office for Information Security, BSI-CC-pp. 0045-2009 for Cryptographic Modules, Security Level "Enhanced", Version 1.01, Feb. 27, 2009, 34 pages.

\* cited by examiner

KEY ATTRIBUTE VERIFICATION

BACKGROUND

The present invention relates generally to cryptographic keys, and more particularly to a key management system utilizing a cryptographic coprocessor capable of storing cryptographic keys and attributes associated with the cryptographic keys.

Server-centric cryptographic services rely on cryptographic coprocessors to store keys in hardware-protected secure storage. Cryptographic coprocessors are typically capable of performing various cryptographic functions, such as cryptographically encrypting and signing data. Cryptographic coprocessors provide high security, but have various limitations, for example, a limited capacity for data storage and a specialized yet restricted range of functionality.

Key management systems provide storage and management of cryptographic keys. For instance, key management systems allow for generating, exchanging, storing, using, destroying, and replacing cryptographic keys. Key management systems may store a multitude of cryptographic keys. Along with each cryptographic key, key management systems may also store various attributes relating to the cryptographic keys. For instance, these attributes may specify when the key was created, for which cryptographic operations it may be used, and when the key expires.

SUMMARY OF THE INVENTION

Embodiment of the present invention include an approach for providing for a key management system and attributes associated with cryptographic keys. In one embodiment, a key identifier that identifies a cryptographic key is transmitted to a cryptographic coprocessor. A first set of attributes is received from the cryptographic coprocessor. One or more attributes in the first set of attributes are associated with the cryptographic key and originate from a key attribute storage in the cryptographic coprocessor. The first set of attributes and a second set of attributes are serialized into a first sequence of attributes. The first sequence of attributes are stored to an attribute frame. One or more attributes in the second set of attributes are associated with the cryptographic key and originate from a key attribute storage of the key management system. The second set of attributes is different from the first set of attributes. The first sequence of attributes is transmitted to the cryptographic coprocessor. A first message authentication code (MAC) calculated from the first sequence of attributes is received from the cryptographic coprocessor. The attribute frame is verified by comparing the first MAC, or a value derived from the first MAC, to a reference value.

BRIEF DESCRIPTION OF THE DRAWINGS

In the following, embodiments are explained in greater detail, by way of example only, making reference to the drawings in which.

DETAILED DESCRIPTION

Figure 1:
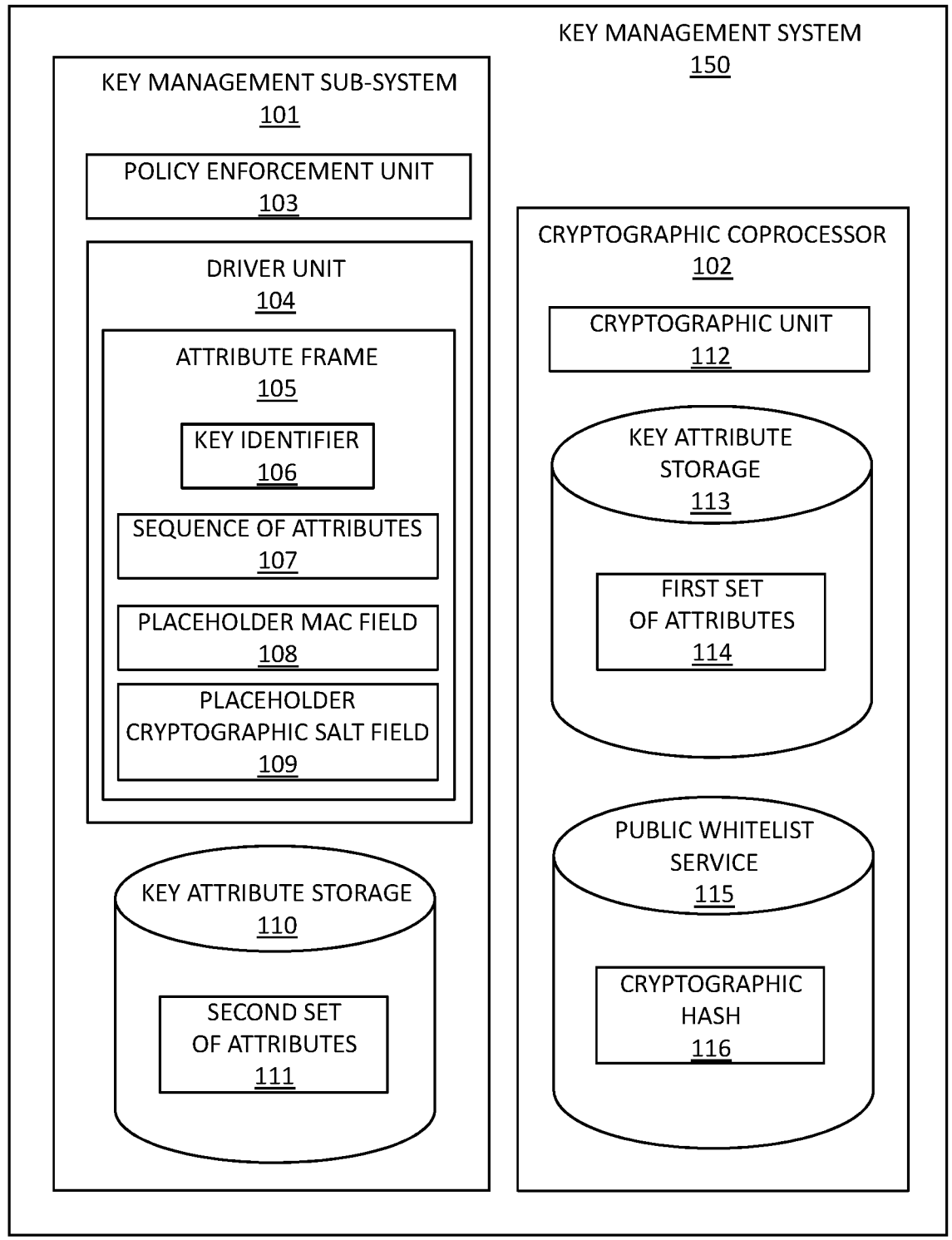
FIG. 1 depicts a block diagram of a key management system and a cryptographic coprocessor, in accordance with an embodiment of the present invention.

The descriptions of the various embodiments of the present invention are being presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Key management systems are capable of storing cryptographic keys and attributes associated with the cryptographic keys. A set of attributes associated with a cryptographic key may need to be altered or extended. One cryptographic key may also be used in conjunction with different sets of attributes. As an example, multiple public-key certificates may be legitimately issued for the same asymmetric key, with disjoint certificate chains and entirely unrelated attributes. As another example, a set of attributes associated with a cryptographic key may experience attribute lifecycle evolution over time. For example, transitions and revocations of certificates may extend metadata associated with a cryptographic key. Therefore, it may be required to ensure that a set of attributes which is associated with a cryptographic key is consistent across multiple devices. Otherwise, the cryptographic key may be used in a way which is unforeseen or unwanted, which may constitute a security issue.

Cryptographic coprocessors can safely store a small number of attributes associated with a cryptographic key. The integrity of these attributes is protected by the cryptographic processor. While key management systems can store many attributes, cryptographic coprocessors are not capable of storing large attribute sets. In order to secure the integrity of all of the attributes associated with a cryptographic key, the key management system therefore cannot store all of the attributes within a cryptographic coprocessor. In addition, cryptographic coprocessors usually lack context to interpret a wide range of attributes and can therefore not make practical use of many of the attributes.

The key management system, according to the present invention, transmits a key identifier that identifies a cryptographic key to the cryptographic coprocessor. According to embodiments, the key identifier is used to identify a key and a specific set of attributes associated with the cryptographic key. In response to transmitting the key identifier to the cryptographic coprocessor, the key management system receives a first set of attributes from the cryptographic coprocessor, the attributes in the first set of attributes being associated with the cryptographic key. According to embodiments, the attributes from the first set of attributes are attributes which are known to the cryptographic coprocessor and/or which the cryptographic coprocessor stores internally.

In an embodiment, the key management system serializes the first set of attributes and a second set of attributes into a sequence of attributes and stores the sequence of attributes within an attribute frame. According to embodiments, the attribute frame preserves multiple attributes for later reference and allows verifying the attribute set at a later point in time. The second set of attributes is a set of attributes stored by a key attribute storage of the key management system. According to embodiments, the key attribute storage may be a system memory or a database of the key management system. According to an embodiment, the first set of attributes contains fewer attributes than the second set of attributes. According to another embodiment, the first set of attributes is a subset of the second set of attributes. This may be due to the fact that the cryptographic coprocessor is not capable of storing as many attributes as the key management system. According to embodiments, the attributes from the sequence of attributes may be stored within the attribute frame in a suitable format. According to embodiments, the sequence of attributes may contain data fields such as booleans, bitmasks, integers, arrays and variable-length containers.

The sequence of attributes is obtained by serializing the first set of attributes and the second set of attributes. Serialization of the attributes may require that the attributes from the first set of attributes and from the second set of attributes are brought into a specific order. According to an embodiment, attributes which are contained within both the first set of attributes and the second set of attributes are inserted only once into the sequence of attributes when the sequence of attributes is constructed. The sequence of attributes contains attributes from the key management system and from the cryptographic coprocessor which are associated with the key identifier.

The key management system transmits the sequence of attributes to the cryptographic coprocessor. In response to transmitting the sequence of attributes to the cryptographic coprocessor, the key management system receives a first message authentication code (MAC) calculated from the sequence of attributes. The first MAC has been calculated by the cryptographic coprocessor. A MAC allows for verification of the integrity of data. In order to verify the integrity of the sequence of attributes, the key management system compares the first MAC, or a value derived from the first MAC, to a reference value. If the first MAC or the value derived from the first MAC is equal to the reference value, then the integrity of the sequence of attributes has been successfully verified.

According to embodiments of the present invention, the reference value is stored within an external database and the key management system is configured to access the reference value from the external database. According to an embodiment, the external database is located within a public whitelist service which can be accessed via an Internet connection. According to another embodiment, the reference value may be stored within the key management system itself. According to another embodiment, the key management system may cause the reference value to be calculated by the cryptographic coprocessor.

The key management system may have the advantage that it can make use of a cryptographic coprocessor in order to verify the integrity of large sets of attributes, which cannot be safely stored within cryptographic coprocessors. In an embodiment, a determination is made whether the correct version of a set of attributes is being used. A first MAC is obtained which uniquely identifies attributes contained within the key management system and the cryptographic coprocessor. An attribute frame containing data relating to the cryptographic key is constructed which can be used for later reference. It can therefore be established that attributes which are being used in conjunction with a cryptographic key are consistent across multiple entities. According to embodiments, the key management system may store the attribute frame for later reference.

According to an embodiment, the key management system is further configured to transmit the attributes from the sequence of attributes to the cryptographic coprocessor in consecutive calls in order to cause the cryptographic coprocessor to iteratively calculate the first MAC. This allows the cryptographic coprocessor to be accessed by separate calls of a limited size, which conforms to coprocessor limitations. The attributes from the sequence of attributes are transmitted consecutively so that they can be processed by the cryptographic coprocessor. The cryptographic coprocessor calculates the first MAC step by step as it receives the attributes. After all of the attributes have been received, the calculation completes, and the cryptographic coprocessor transmits the first MAC to the key management system, and the key management system receives the first MAC.

According to an embodiment, the key management system is further configured to construct a placeholder MAC field in the attribute frame, and to store the first MAC received from the cryptographic coprocessor in the placeholder. Storing the MAC in this manner has the advantage that the attribute frame can be used for reference at a later point of time, so that the integrity of the attributes from the sequence of attributes may be verified by means of the first MAC. According to another embodiment, the key management system also stores the attribute key within the attribute frame. Storing the attribute key has the advantage that it can quickly be determined which attribute key the sequence of attributes and the first MAC, which are stored within the attribute frame, are associated with.

According to another embodiment, the key management system is further configured to construct a placeholder cryptographic salt field in the attribute frame, to receive a cryptographic salt from the cryptographic coprocessor, in response to transmitting the sequence of attributes, and to store the cryptographic salt in the placeholder. According to embodiments, a cryptographic salt, which has been used for generating the first MAC, is received by the key management system and stored in the placeholder field within the attribute frame. The cryptographic salt ensures that contents of the sequence of attributes cannot be easily inferred from the first MAC. Additionally, using a salt prevents malicious entities that know the sequence of attributes from obtaining a MAC directly calculated from that known sequence of attributes, which may prevent compromise of the system.

According to embodiments, the cryptographic salt is used by the cryptographic coprocessor for calculating the first MAC, altering the outcome of the first MAC. If a cryptographic salt is not used, then an attacker may generate a table containing various sequences of attributes and corresponding MACs. Given a MAC, the attacker may then use the table to look up a corresponding sequence of attributes. If a cryptographic salt is used for calculation of the first MAC, this type of attack may become less likely. According to an embodiment, the cryptographic salt is randomly generated by the cryptographic coprocessor. In embodiments where the cryptographic salt has been used for calculating the first MAC, the salt is also required for verifying whether a given sequence of attributes corresponds to the first MAC. According to embodiments, the cryptographic salt is therefore stored in the attribute frame for later reference.

According to another embodiment, the key management system is further configured to serialize the first set of attributes and the second set of attributes according to a normalization scheme, and to transmit the attributes from the sequence of attributes to the cryptographic coprocessor according to their order within the sequence of attributes. The normalization scheme has the advantage that it ensures that the first set of attributes and the second set of attributes are ordered in a consistent manner during serialization. Starting out, the attributes within the first set of attributes and the second set of attributes do not necessarily have an inherent ordering which can be guaranteed to be the same across different devices. For instance, the attributes from the first set of attributes may be transmitted to the key management system by the cryptographic coprocessor in an order in which the attributes are stored within a key attribute storage of the cryptographic coprocessor. Likewise, the attributes from the second set of attributes may be stored in the key management system in an arbitrary order. However, in order to ensure that the same MAC will always be generated from the attributes originating from the first set of attributes and the second set of attributes, the attributes need to be provided to the cryptographic coprocessor in a consistent order. Changing the order of the attributes would result in a different first MAC being generated.

Using the normalization scheme has the advantage that it always brings the attributes from the first set of attributes and the second set of attributes into the same order. According to an embodiment, the order of the attributes within the sequence of attributes is immutable. Because a consistent ordering is enforced, different key management systems will generate identical sequences of attributes, provided that they employ the same normalization scheme. This ensures that the same first MAC will always be calculated for matching sets of attributes.

According to an embodiment, the normalization scheme is dependent upon properties of the attributes being serialized, the properties being selected from the group consisting of attribute values and attribute types. Attribute values denote contents of the attributes. In one example, attributes which contain only zeroes may be placed at the beginning or at an end of the sequence of attributes. Attribute types denote the type of attribute data stored within the attributes. For instance, possible attribute types may include a key identity type which allows for uniquely identifying a key, a key entity type which identifies an entity that the key is assigned to, a cryptographic key type, such as a secret key, a private key, or a public key, and a key usage type that declares which cryptographic algorithms a key can be used for. Attributes may be brought into a predetermined ordering according to their attribute types. This embodiment has the advantage that criteria for ordering the attributes are provided. According to an embodiment, attributes are brought into a predetermined order according to both their types and their values. According to another embodiment, the attributes may also be ordered according to other criteria.

According to an embodiment, verifying the attribute frame by the key management system comprises transmitting again the sequence of attributes from the attribute frame to the cryptographic coprocessor, calculating a first cryptographic hash from the first MAC, receiving a second cryptographic hash as the reference value from the cryptographic coprocessor, and comparing the first cryptographic hash to the second cryptographic hash in order to verify the attribute frame. According to this embodiment, a value is derived from the first MAC by calculating the first cryptographic hash. The second cryptographic hash, which the key management system receives from the cryptographic coprocessor, is used as the reference value. Verification is successful if the first cryptographic hash and the second cryptographic hash match. This embodiment has the advantage that the reference value is calculated by the cryptographic coprocessor and does not need to be obtained from an external database or another external source. The fact that the first cryptographic hash and the second cryptographic hash are compared to each other instead of two MACs may have a security advantage: if the cryptographic coprocessor were to return a MAC instead of the second cryptographic hash, then the cryptographic coprocessor could be used as a signing oracle.

According to an embodiment, the key management system is configured to receive a failure notification from the cryptographic coprocessor if verification has failed. According to another embodiment, the key management system is configured to assess verification as having failed if the key management receives no second cryptographic hash in response to transmitting again the sequence of attributes from the attribute frame to the cryptographic coprocessor. This may be the case if the key management requires verification in the context of its communication protocols; i.e., an active acknowledgement from its communication partners. In this case, even a lack of a success notification qualifies as a failure.

According to an embodiment, verifying the attribute frame by the key management system further comprises transmitting again the key identifier to the cryptographic coprocessor, receiving a third set of attributes from the cryptographic coprocessor, the attributes in the third set of attributes being associated with the cryptographic key, validating that a subset of attributes from the sequence of attributes conforms to the third set of attributes, and, if validation of the subset is not successful, stopping verification of the attribute frame. This has the advantage that the verification process can be aborted if it has been established that the third set of attributes does not conform to the subset of attributes from the sequence of attributes. Effectively, this would mean that the key management system stores different attributes in association with the cryptographic key than the cryptographic coprocessor.

According to an embodiment, validation is performed before transmitting the sequence of attributes from the attribute frame again to the cryptographic coprocessor. The third set of attributes is a set of attributes which the cryptographic coprocessor stores in association with the cryptographic key. According to another embodiment, the subset of attributes from the sequence of attributes is identical to the first set of attributes which has been previously received by the key management system from the cryptographic coprocessor. According to another embodiment, the subset of attributes from the sequence of attributes contains at least some of the attributes from the first set of attributes.

According to an embodiment, the key management system performs validation by checking whether the attributes from the subset of attributes are equal to the attributes from the third set of attributes. According to another embodiment, the key management system performs validation by checking whether attributes from the third set of attributes, which match attributes from the sequence of attributes with regard to their attribute types, also match these attributes with regard to their values. In an embodiment, it may be determined whether attributes which specify a date on which the cryptographic key was created (attribute type) contain the same date (attribute value) in both the subset of attributes and the third set of attributes.

According to embodiments, an attribute conforms to another attribute if is equal to the other attribute with regard to attribute value and/or attribute type. According to other embodiments, an attribute from the third set of attributes may conform to an attribute from the subset of attributes if there is no differences between these attributes with regard to security policies, expected value ranges, or other properties.

The present invention also relates to computer program product for operating a key management system. According to embodiments, the computer program product has program instructions which cause a processor of the key management system to operate as described above. All of the actions of the key management system as described above can be affected by embodiments of the computer program product in arbitrary combinations.

The present invention also relates to a method for operating a key management system. According to embodiments, the method comprises the actions of the key management system as described above. According to embodiments of the method, all the actions of the key management system as described above can be performed in arbitrary combinations.

The cryptographic coprocessor according, to the present invention, is configured to assist a key management system to identify and/or verify an attribute frame. In particular, the cryptographic coprocessor is configured to receive a key identifier from a key management system that identifies a cryptographic key. The cryptographic coprocessor then transmits a first set of attributes to the key management system, the attributes in the first set of attributes being associated with the cryptographic key and originating from a key attribute storage of the cryptographic coprocessor. The attributes from the first set of attributes are attributes associated with a cryptographic key stored by the cryptographic coprocessor. Because of resource restrictions, cryptographic coprocessors only store a few key attributes internally. According to an embodiment, the cryptographic coprocessor obtains the first set of attributes by selecting a set of attributes associated with the key identifier from its key attribute storage.

In response to transmitting the first set of attributes, the cryptographic coprocessor receives a sequence of attributes from the key management system, wherein the sequence of attributes contains the first set of attributes and a second set of attributes. In an embodiment, the attributes from the second set of attributes are associated with the cryptographic key, and the second set of attributes are different from the first set of attributes. According to embodiments, the attributes from the second set of attributes are attributes which are not stored internally within the cryptographic coprocessor. Instead, these attributes may originate from an internal storage of the key management system. The cryptographic coprocessor calculates a first MAC from the sequence of attributes and transmits the first MAC to the key management system. The cryptographic coprocessor has the advantage that it allows the key management system to obtain the first MAC, which the key management system may then use for identification and/or verification purposes. Additionally, the discussed communication flow is advantageous in that it transmits the first set of attributes to the key management system, which provides the key management system with information regarding which attributes are known to the cryptographic coprocessor.

According to an embodiment, the cryptographic coprocessor is further configured to generate the first MAC iteratively by receiving the sequence of attributes from the key management system in consecutive calls. According to this embodiment, the attributes from the sequences of attribute are received by the cryptographic coprocessor one after another. This embodiment conforms to the way cryptographic coprocessors operate, namely by receiving calls which generally contain relatively small amounts of data. Some application programming interfaces (APIs) of cryptographic service providers may offer related functionality, which may be used in this context. According to embodiments, the cryptographic coprocessor calculates the first MAC from the attributes step by step. It may be of high importance that the attributes are received in their correct order, meaning that the order of the attributes within the sequence of attributes may not be changed before or while being received by the cryptographic coprocessor. Otherwise, the first MAC which is generated from the sequence of attributes will be incorrect.

According to an embodiment, the cryptographic coprocessor is configured to store data required for iteratively generating the first MAC between the consecutive calls. This has the advantage that the first MAC can be generated iteratively with only minimal memory requirements within the cryptographic coprocessor. According to an embodiment, the cryptographic coprocessor receives a first attribute from the sequence of attributes and performs a first calculation step for generating the first MAC. The first calculation step yields a first intermediate result for calculating the first MAC. The cryptographic coprocessor then stores the first intermediate result and proceeds to receive a second attribute from the sequence of attributes. The cryptographic coprocessor then performs a second calculation step, using the first intermediate result and the second attribute as inputs, yielding a second intermediate result. The second intermediate result is then stored in place of the first intermediate result. This process continues until a last attribute from the sequence of attributes has been received. The cryptographic coprocessor then performs a last calculation step, by which the first MAC is obtained. According to another embodiment, the cryptographic coprocessor receives the attributes from the sequence of attributes via consecutive calls and stores the complete sequence of attributes within the cryptographic coprocessor. According to this embodiment, the cryptographic coprocessor calculates the first MAC from the sequence of attributes after the complete sequence of attributes has been received.

According to another embodiment, the cryptographic coprocessor is configured to generate a cryptographic salt, use said cryptographic salt as an input for calculating the first MAC, and to transmit the cryptographic salt to the key management system. As has been discussed above, using a cryptographic salt when calculating a MAC increases the level of security. This embodiment therefore has the advantage that it provides an improved level of security. The cryptographic salt is transmitted to the key management system because verifying the integrity of the sequence of attributes will require not only the first MAC, but also the cryptographic salt. According to an embodiment, the cryptographic salt is appended to the sequence of attributes when calculating the first MAC. According to other embodiments, the cryptographic salt may be used in the process of MAC calculation in another manner. According to another embodiment, the cryptographic salt is randomly generated.

According to another embodiment, the cryptographic coprocessor is configured to validate that a subset of attributes from the sequence of attributes conforms to the first set of attributes, and to notify the key management system if said validation fails. This embodiment has the advantage that the process of calculating the first MAC can be stopped in the case of invalid input data. In particular, according to embodiments, validation may be stopped if the key management system and the cryptographic coprocessor operate with different attributes in relation to the cryptographic key.

According to an embodiment, validating the subset of attributes comprises comparing properties of the attributes from the sequence of attributes to properties of the attributes in the first set of attributes, the properties of the attributes being selected from the group consisting of attribute values and attribute types. According to another embodiment, the cryptographic coprocessor performs validation by checking whether attributes from the first set of attributes, which match attributes from the sequence of attributes with regard to their attribute types, also match these attributes with regard to their values. For instance, according to an embodiment it may be determined whether attributes which specify a date on which the cryptographic key was created (attribute type) store the same date (attribute value) in both the subset of attributes and the first set of attributes. According to another embodiment, the cryptographic coprocessor performs validation by determining whether all of the attributes from the first set of attributes are contained within the sequence of attributes, forming the subset of attributes. According to another embodiment, validation is performed by determining whether there are cryptographic policy mismatches or other types of differences between the sequence of attributes and the first set of attributes.

According to another embodiment, the cryptographic coprocessor is further configured for verifying an attribute frame, wherein verifying the attribute frame comprises receiving again the sequence of attributes from the key management system, calculating a second MAC from the sequence of attributes, calculating a second cryptographic hash from the second MAC, and transmitting the second cryptographic hash for use as a reference value to the key management system. This embodiment has the advantage that the cryptographic coprocessor supports the verification of the attribute frame by providing the reference value. The key management system does not have to query any external database in order to obtain the second cryptographic hash. The second MAC is calculated from the sequence of attributes, and the second cryptographic hash is calculated from the second MAC. Transmitting the second cryptographic hash, instead of the second MAC, to the key management system prevents attacks against the cryptographic coprocessor when the cryptographic coprocessor is used as a signing oracle.

According to another embodiment, the cryptographic coprocessor is configured such that verifying the attribute frame further comprises receiving the key identifier again from the key management system, and transmitting a third set of attributes to the key management system, the attributes in the third set of attributes being associated with the cryptographic key and originating from the key attribute storage of the cryptographic coprocessor. According to an embodiment, the cryptographic coprocessor obtains the third set of attributes by selecting a set of attributes associated with the key identifier from its key attribute storage. This allows the key management system to obtain the third set of attributes. This embodiment has the advantage that the cryptographic coprocessor provides the third set of attributes to the key management system. The key management system can validate the third set of attributes and stop the verification process early if there are inconsistencies regarding the third attribute set.

According to another embodiment, the cryptographic coprocessor is configured to validate, during verification, that a subset of attributes from the sequence of attributes conforms to the third set of attributes, and to notify the key management system if said validation fails. During verification, the cryptographic coprocessor receives the sequence of attributes. According to an embodiment, the cryptographic coprocessor performs validation by determining whether attributes from the third set of attributes, which match attributes from the sequence of attributes with regard to their attribute types, also match these attributes with regard to their values. In an embodiment, it may be determined whether attributes which specify a date on which the cryptographic key was created (attribute type) store the same date (attribute value) in both the subset of attributes and the third set of attributes. According to another embodiment, the cryptographic coprocessor performs validation by determining whether all of the attributes from the third set of attributes are contained within the sequence of attributes, forming the subset of attributes. According to another embodiment, the cryptographic coprocessor determines whether there are mismatches of any other kind between the attributes from the third set of attributes and the attributes from the subset of attributes.

The invention also relates to a computer program product for operating a cryptographic coprocessor. In an embodiment, the computer program product includes program instructions which cause the cryptographic coprocessor to operate as described above. According to embodiments, all of the actions of the cryptographic coprocessor as described above can be affected by the computer program product in arbitrary combinations.

The invention also relates to a method for operating a cryptographic coprocessor. Embodiments of the method comprise the actions of the cryptographic coprocessor as described above. According to embodiments of the method, all of the actions of the cryptographic coprocessor as described above can be performed in arbitrary combinations.

According to embodiments, the key management system and the cryptographic coprocessor are located within a computer system. According to embodiments, the key management system may run on a computer processor, the computer processor being connected to the cryptographic coprocessor. The computer processor may be connected to the cryptographic coprocessor via a system bus. According to other embodiments, the cryptographic coprocessor may be operated remotely from the key management system.

In an embodiment, the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagram may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

FIG. 1 depicts a block diagram of a computing system, generally designated 100, of key management system 150. Key management system 150 includes key management sub-system 101 and cryptographic coprocessor 102.

As an example, the key management sub-system 101 contains a policy enforcement unit 103, driver unit 104, and key attribute storage 110. Policy enforcement unit 103 is responsible for reading, writing and logging cryptographic policy settings. Driver unit 104 allows access to cryptographic coprocessor 102. As exemplarily depicted, driver unit 104 has assembled attribute frame 105 comprising key identifier 106, sequence of attributes 107, placeholder message authentication code (MAC) field 108, and placeholder cryptographic salt field 109. Placeholder MAC field 108 and placeholder cryptographic salt field 109 can store a MAC and a cryptographic salt, respectively. Sequence of attributes 107 may contain multiple attributes which are associated with a cryptographic key that is identified by key identifier 106. For example, the attributes may be stored within sequence of attributes 107 as sequences of booleans, as bitmasks, as integers, in arrays, or in variable-length fields. The attributes describe various properties of the cryptographic key. Key attribute storage 110 stores a multitude of keys and their associated attributes. Among other attribute sets, key attribute storage 110 stores second set of attributes 111. Second set of attributes 111 can be associated with the cryptographic key that key identifier 106 makes reference to.

Cryptographic coprocessor 102 contains cryptographic unit 112, key attribute storage 113, and public whitelist service 115. Key attribute storage 113 is capable of performing various cryptographic functions such as encrypting and signing data. Key attribute storage 113 included in cryptographic coprocessor 102 stores various cryptographic keys and their associated attributes. Among other attribute sets, key attribute storage 113 stores first set of attributes 114 which is associated with the cryptographic key. Due to the storage capacity of cryptographic coprocessor 102, first set of attributes 114 contains fewer attributes than second set of attributes 111, which is stored by key management subsystem 101 in key attribute storage 110, even though both second set of attributes 111 and first set of attributes 114 are associated with the same cryptographic key.

As an alternative, public whitelist service 115 may be run on a server independent of cryptographic coprocessor 102 and key management system 150, which can be accessed via the internet. Public whitelist service 115 stores a great number of cryptographic hashes, among them cryptographic hash 116 which is associated with the cryptographic key that is identified by key identifier 106.

Figure 2:
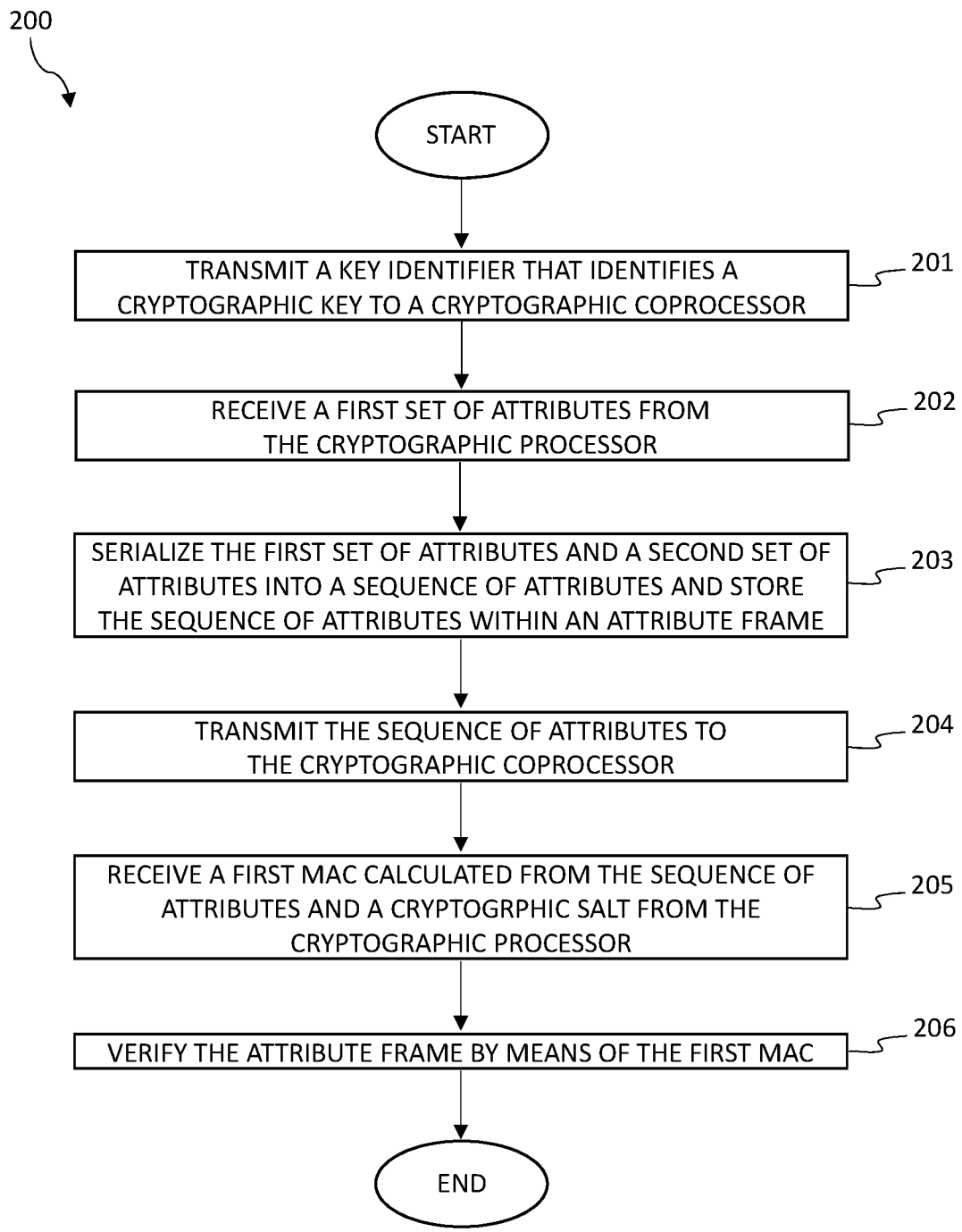
FIG. 2 is a flowchart detailing the operation of the key management system, in accordance with an embodiment of the present invention.

FIG. 2 is a flowchart of workflow 200 detailing the operation of a key management system, such as key management system 150. The key management system may transmit a key identifier that identifies the cryptographic key to the cryptographic coprocessor (step 201). In response to transmitting the key identifier, the key management system may receive the first set of attributes from the cryptographic coprocessor (step 202). The key management system now knows which attributes the cryptographic coprocessor stores in relation to the cryptographic key. The first set of attributes and the second set of attributes have to be brought into a normalized form. For this purpose, the key management system serializes the first set of attributes and the second set of attributes into a sequence of attributes and stores the sequence of attributes within the attribute frame (step 203). Serialization can be performed using an agreed-upon normalization scheme. This means that serializing the same attributes will always result in a sequence of attributes wherein the attributes have the same order.

The key management system may transmit the sequence of attributes to the cryptographic coprocessor (step 204). For instance, the attributes can be transmitted to the cryptographic coprocessor according to their order within the sequence of attributes. In response to transmitting the sequence of attributes, the key management system receives a first MAC and a cryptographic salt from the cryptographic coprocessor (step 205). In this example, the first MAC has been calculated from the sequence of attributes by the cryptographic coprocessor. The key management system stores the first MAC in the placeholder MAC field of the attribute frame. The cryptographic salt has been used by the cryptographic coprocessor in order to calculate the first MAC. The cryptographic salt is required for verification purposes when verifying the first MAC. The key management system may therefore store the cryptographic salt in the placeholder cryptographic salt field of the attribute frame. The key management system may subsequently verify the attribute frame by means of the first MAC (step 206). As described subsequently, there are different ways of how the attribute frame may be verified.

Figure 3:
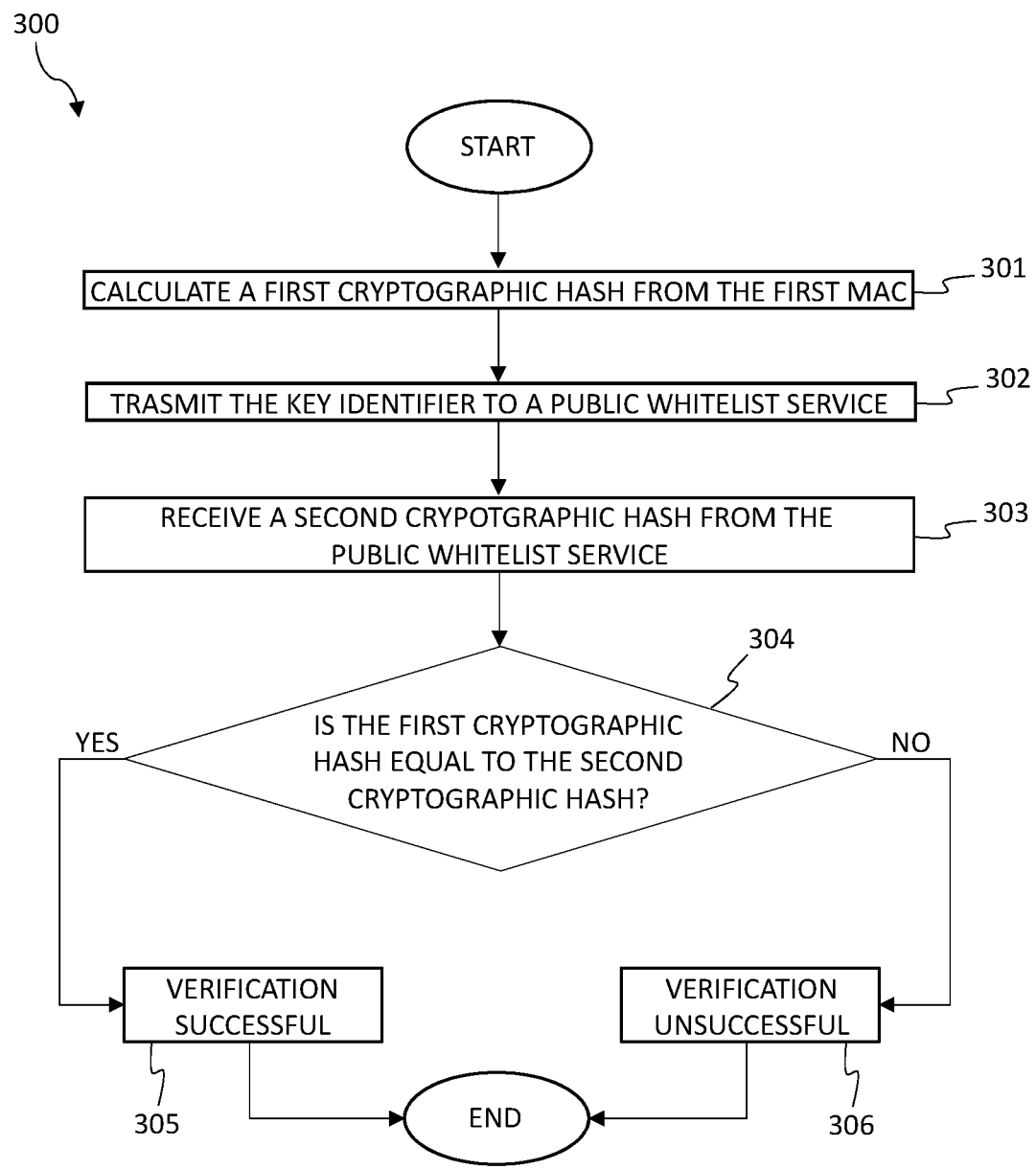
FIG. 3 is a flowchart detailing the operation of the key management system, wherein the key management system exemplarily uses a public whitelist service for verification, in accordance with an embodiment of the present invention.

FIG. 3 is a flowchart of workflow 300 detailing the operation of a key management system, wherein the key management system exemplarily uses a public whitelist service for verification. The first MAC allows for verification of the integrity, or the correct versioning, of the attributes stored in the attribute frame. The key management system calculates a first cryptographic hash (step 301). In this example, the key management system transmits the key identifier to a public whitelist service (step 302). The public whitelist server may be implemented by an Internet service which runs on a server that is connected to the Internet. In response to transmitting the key identifier to the public whitelist service, the key management system receives a second cryptographic hash from the public whitelist service (step 303). According to this example, the key management system then compares the first cryptographic hash to the second cryptographic hash (step 304). If the first cryptographic hash and the second cryptographic hash are equal, then verification is successful (step 305). Thus, it has been confirmed that the sequence of attributes from the attribute frame, as stored by the key management system, is the same as a sequence of attributes that the public whitelist service associates with the key identifier. If the first cryptographic hash is not equal to the second cryptographic hash, then verification has not been successful (step 306).

The second cryptographic hash, as transmitted by the whitelist service, may be a partial cryptographic hash according to some embodiments. This means that the whitelist service does not transmit a full hash, but just selected bits of the second cryptographic hash. The key management system may then compare these transmitted bits to bits at corresponding positions of the first cryptographic hash. In this manner, the key management system can perform verification without receiving the second cryptographic hash in full. The second cryptographic hash is not disclosed in full to the key management system or to other users of the whitelist service. This is a privacy-preserving feature which may prevent abuse of the second cryptographic hash.

Figure 4:
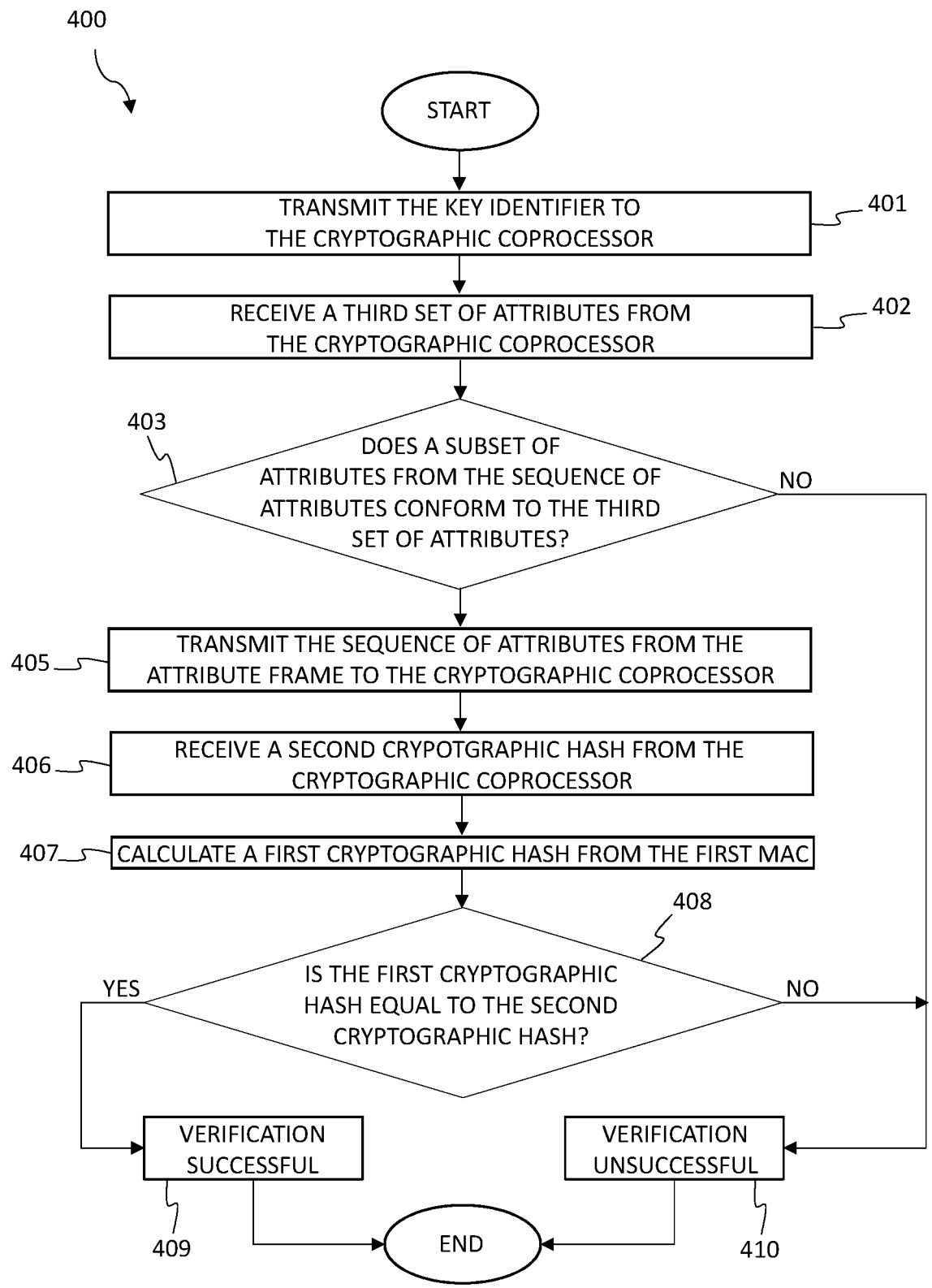
FIG. 4 is a flowchart detailing the operation of the key management system, wherein the key management system uses the cryptographic coprocessor for verification, in accordance with an embodiment of the present invention.

FIG. 4 is a flowchart of workflow 400 detailing the operation of a key management system, wherein the key management system uses the cryptographic coprocessor for verification. As an example, the key management system transmits the key identifier to the cryptographic coprocessor (step 401). In response to the transmitting the key identifier, the key management system receives a third set of attributes from the cryptographic coprocessor (step 402). The third set of attributes may contain attributes which the cryptographic coprocessor associates with the key identifier. The key management system checks whether a subset of attributes from the sequence of attributes conforms to the third set of attributes (step 403). According to this example, the key management system establishes that attributes from the third set of attributes which match attributes from the sequence of attributes with regard to their attribute types also match these attributes with regard to their values. If this is not the case, then this means that the cryptographic coprocessor stores different attributes in association with the key identifier than would be expected, and verification fails (step 410).

If the attributes from the third set of attributes conform to the attributes from the sequence of attributes, then the verification process continues. The key management system transmits the sequence of attributes from the attribute frame to the cryptographic coprocessor (step 405). Along with the sequence of attributes, the key management system may also transmit the cryptographic salt to the cryptographic coprocessor. In response to transmitting the sequence of attributes, the key management system receives a second cryptographic hash from the cryptographic coprocessor (step 406). The key management system calculates a first cryptographic hash from the first MAC (step 407). The key management system then compares the first cryptographic hash to the second cryptographic hash (step 408). According to the present example, if the first cryptographic hash and the second cryptographic hash are equal, then verification is successful (step 409). The successful comparison confirms the integrity of the attributes in the attribute frame. If the first cryptographic hash is not equal to the second cryptographic hash, then verification has not been successful (step 410).

Figure 5:
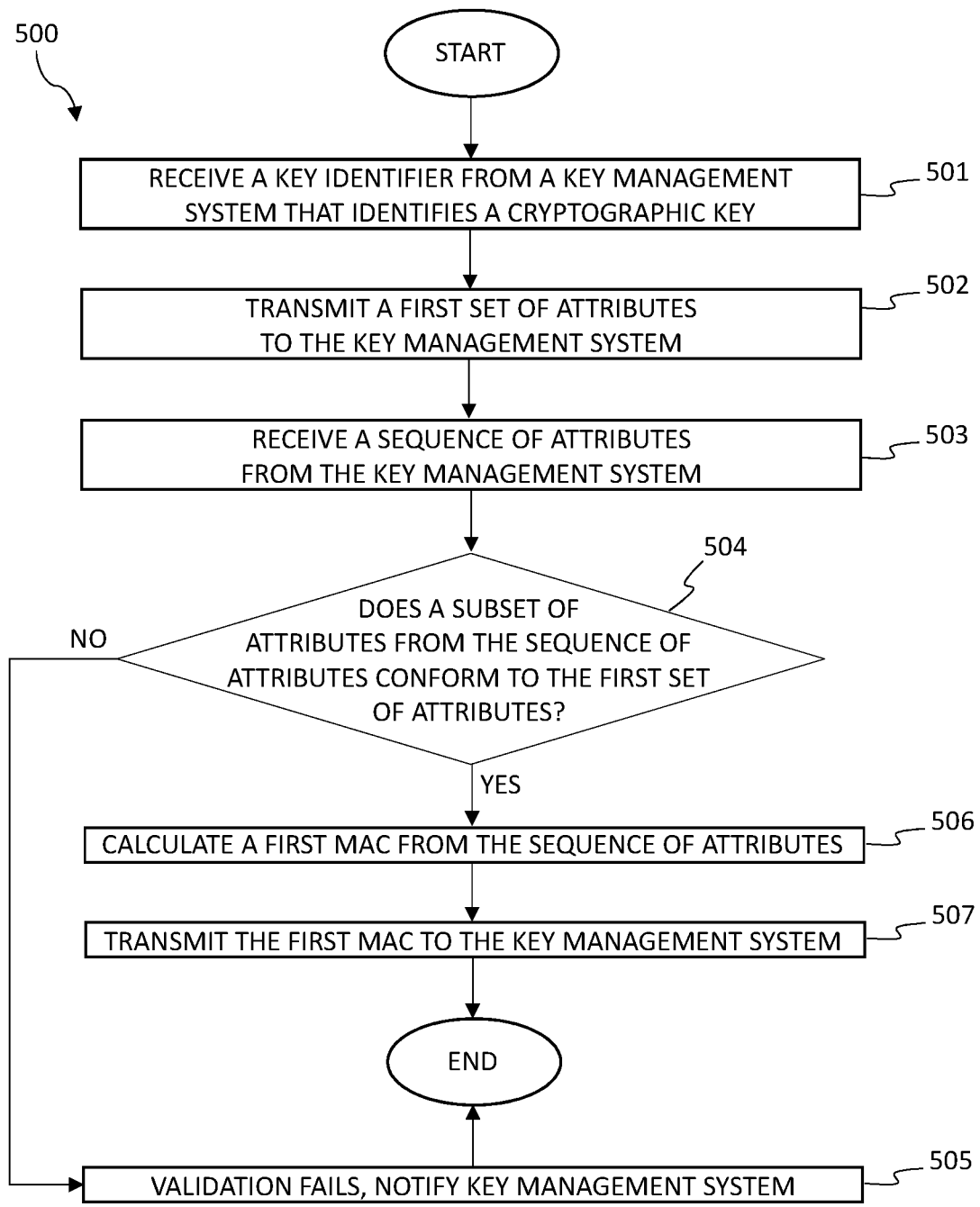
FIG. 5 is a flowchart detailing the operation of the cryptographic coprocessor, in accordance with an embodiment of the present invention.

FIG. 5 is a flowchart of workflow 500 detailing the operation of a cryptographic coprocessor, such as cryptographic coprocessor 102. As an example, the cryptographic coprocessor can receive the key identifier from the key management system (step 501). In response to receiving the key identifier from the key management system, the cryptographic coprocessor may transmit the first set of attributes to the key management system (step 502). Exemplarily, the first set of attributes is stored within the key attribute storage of the cryptographic coprocessor. The cryptographic coprocessor may load the first set of attributes from the key attribute storage. In response to transmitting the first set of attributes to the key management system, the cryptographic coprocessor receives the sequence of attributes from the key management system (step 503).

According to the present example, the cryptographic coprocessor validates whether a subset of attributes from the sequence of attributes conforms to the first set of attributes (step 504). Validation may be performed by checking that attributes from the first set of attributes, which match attributes from the sequence of attributes with regard to their attribute types, also match these attributes with regard to their values. If this is not the case, then it can be concluded that the key management system is not using the same attributes in conjunction with the key identifier and its associated key as the cryptographic coprocessor. Validation fails and the cryptographic coprocessor notifies the key management system (step 505). If validation is successful, then the cryptographic coprocessor calculates the first MAC from the sequence of attributes (step 506). In order to calculate the first MAC, the cryptographic coprocessor may randomly generate a cryptographic salt. The cryptographic coprocessor can use the cryptographic salt for generating the first MAC. This may help to protect against attacks in which a reverse lookup of the first MAC is performed. After generating the first MAC, the cryptographic coprocessor may transmit the first MAC to the key management system (step 507).

Figure 6:
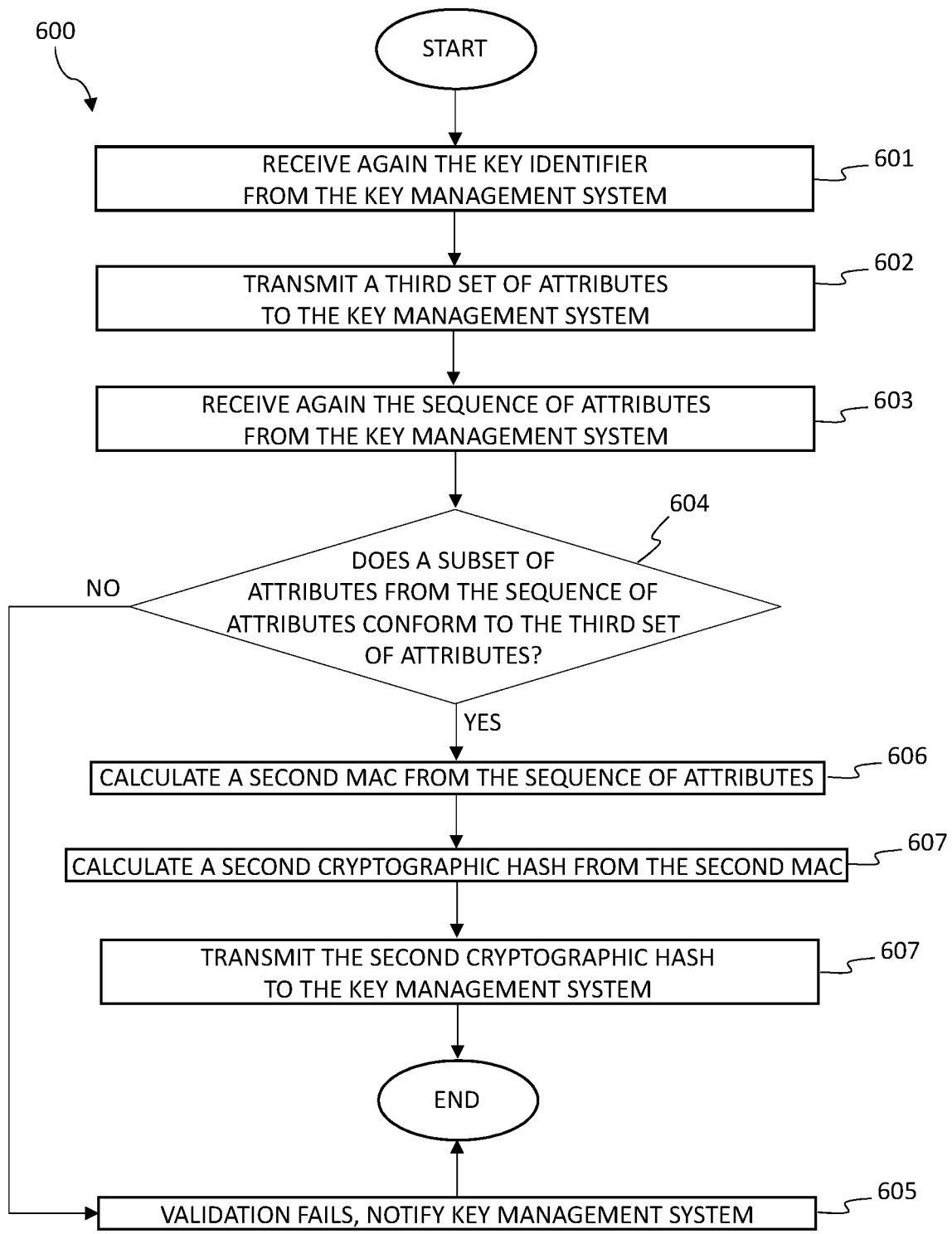
FIG. 6 is a flowchart detailing the operation of the cryptographic coprocessor during verification, in accordance with an embodiment of the present invention.

FIG. 6 is a flowchart of workflow 600 detailing the operation of a cryptographic coprocessor during verification. The cryptographic coprocessor exemplarily receives the key identifier from the key management system again (step 601). This time, the key identifier is received for the purpose of validation. As an example, the cryptographic coprocessor can retrieve a third set of attributes in accordance with the key identifier from its internal storage. The third set of attributes is expected to contain the same attributes as the first set of attributes, unless there have been changes to the data within the key attribute storage of the cryptographic coprocessor. The cryptographic coprocessor may transmit the third set of attributes to the key management system (step 602). The key management system can then validate the integrity of the third set of attributes. In response to transmitting the third set of attributes to the key management system, the cryptographic coprocessor receives again the sequence of attributes from the key management system (step 603). The cryptographic coprocessor validates whether a subset of attributes from the sequence of attributes conforms to the third set of attributes (step 604). According to the present example, validation is performed by checking that attributes from the third set of attributes which match attributes from the sequence of attributes with regard to their attribute types also match these attributes with regard to their values. If this is not the case, then it can be concluded that the key management system is not using the same attributes in conjunction with the cryptographic key as the cryptographic coprocessor. Validation fails and the cryptographic coprocessor notifies the key management system that validation has failed (step 605). This also means that verification of the attribute frame has failed. If validation is successful, then the cryptographic coprocessor may calculate the second MAC from the sequence of attributes (step 606). Subsequently, the cryptographic coprocessor may calculate the second cryptographic hash from the second MAC (step 607). The cryptographic coprocessor then transmits the second cryptographic hash to the key management system (step 608). According to this example, the key management system can then compare the first cryptographic hash to the second cryptographic hash in order to conclude the verification process.

Figure 7:
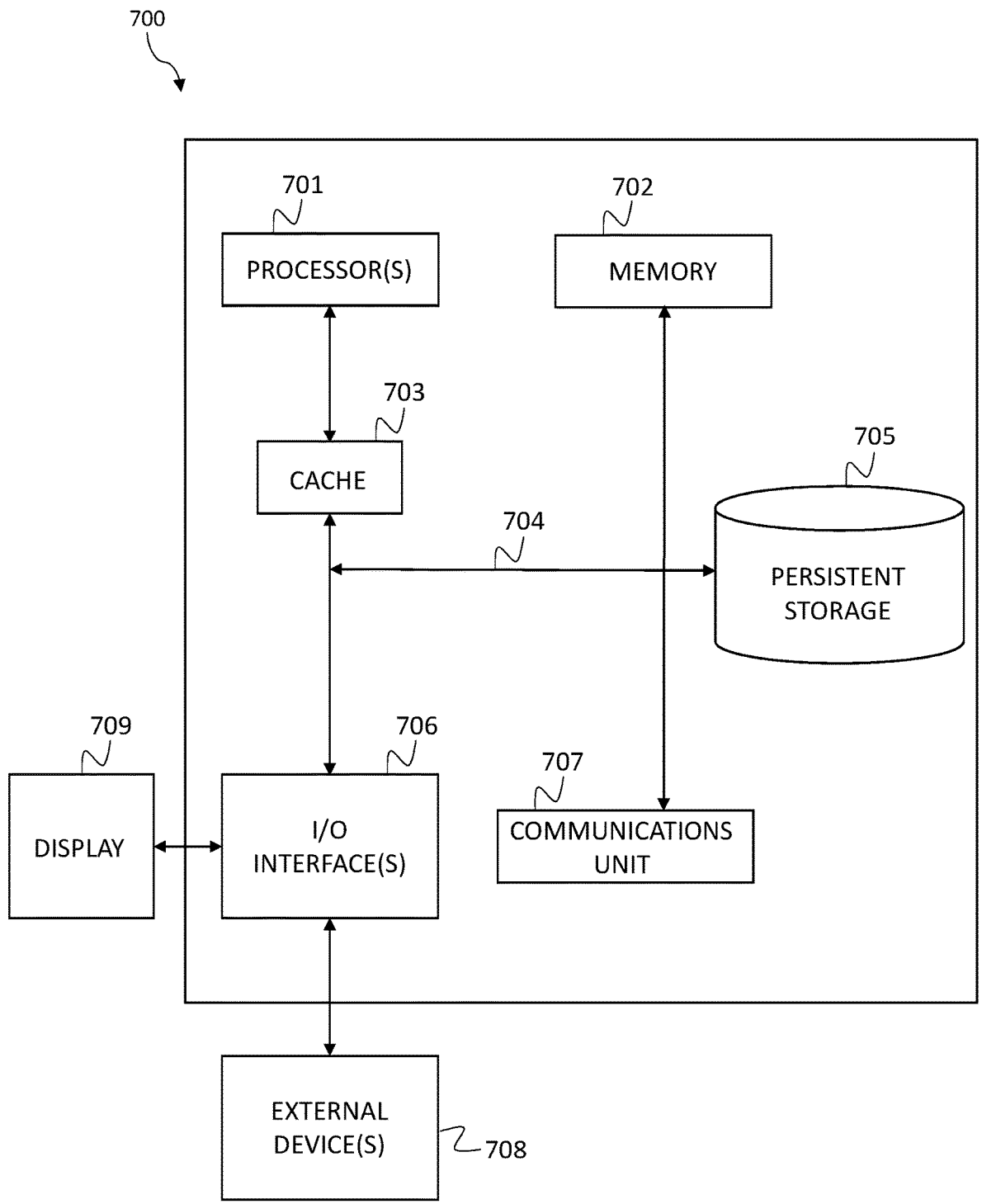
FIG. 7 depicts a block diagram of components of the computing environment of FIG. 1, in accordance with an embodiment of the present invention.

FIG. 7 depicts computer system 700, which is an example of a system substantially similar to key management system 150. Computer system 700 includes processors 701, cache 703, memory 702, persistent storage 705, communications unit 707, input/output (I/O) interface(s) 706 and communications fabric 704. Communications fabric 704 provides communications between cache 703, memory 702, persistent storage 705, communications unit 707, and input/output (I/O) interface(s) 706. Communications fabric 704 can be implemented with any architecture designed for passing data and/or control information between processors (such as microprocessors, communications and network processors, etc.), system memory, peripheral devices, and any other hardware components within a system. For example, communications fabric 704 can be implemented with one or more buses or a crossbar switch.

Memory 702 and persistent storage 705 are computer readable storage media. In this embodiment, memory 702 includes random access memory (RAM). In general, memory 702 can include any suitable volatile or non-volatile computer readable storage media. Cache 703 is a fast memory that enhances the performance of processors 701 by holding recently accessed data, and data near recently accessed data, from memory 702.

Program instructions and data used to practice embodiments of the present invention may be stored in persistent storage 705 and in memory 702 for execution by one or more of the respective processors 701 via cache 703. In an embodiment, persistent storage 705 includes a magnetic hard disk drive. Alternatively, or in addition to a magnetic hard disk drive, persistent storage 705 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 705 may also be removable. For example, a removable hard drive may be used for persistent storage 705. Other examples include optical and magnetic disks, thumb drives, and smart cards that are inserted into a drive for transfer onto another computer readable storage medium that is also part of persistent storage 705.

Communications unit 707, in these examples, provides for communications with other data processing systems or devices. In these examples, communications unit 707 includes one or more network interface cards. Communications unit 707 may provide communications through the use of either or both physical and wireless communications links. Program instructions and data used to practice embodiments of the present invention may be downloaded to persistent storage 705 through communications unit 707.

I/O interface(s) 706 allows for input and output of data with other devices that may be connected to each computer system. For example, I/O interface 706 may provide a connection to external devices 708 such as a keyboard, keypad, a touch screen, and/or some other suitable input device. External devices 708 can also include portable computer readable storage media such as, for example, thumb drives, portable optical or magnetic disks, and memory cards. Software and data used to practice embodiments of the present invention can be stored on such portable computer readable storage media and can be loaded onto persistent storage 705 via I/O interface(s) 706. I/O interface(s) 706 also connect to display 709.

Display 709 provides a mechanism to display data to a user and may be, for example, a computer monitor.

What is claimed is:

1. A computer system, the computer system comprising:
one or more computer processors;
one or more computer readable storage media; and
program instructions stored on the one or more computer readable storage media for execution by at least one of the one or more processors, the program instructions comprising:
program instructions to transmit a key identifier that identifies a cryptographic key to a cryptographic coprocessor;
in response to transmitting the key identifier, program instructions to receive a first set of attributes from the cryptographic coprocessor, wherein one or more attributes in the first set of attributes are associated with the cryptographic key and originating from a key attribute storage of the cryptographic coprocessor;
program instructions to serialize the first set of attributes and a second set of attributes into a first sequence of attributes; store the first sequence of attributes within an attribute frame, wherein one or more attributes in the second set of attributes are associated with the cryptographic key, said one or more attributes in the second set originating from a key attribute storage of the key management system, and the second set of attributes being different from the first set of attributes;
program instructions to transmit the first sequence of attributes from the attribute frame to the cryptographic coprocessor;
in response to transmitting the first sequence of attributes, program instructions to receive from the cryptographic coprocessor a first message authentication code (MAC) calculated from the first sequence of attributes; and
program instructions to verify the attribute frame by comparing the first MAC or a value derived from the first MAC to a reference value.

2. The computer system of claim 1, further comprising:
program instructions to transmit the one or more attributes from the first sequence of attributes to the cryptographic coprocessor in consecutive calls in order to cause the cryptographic coprocessor to iteratively calculate the first MAC.

3. The computer system of claim 1, further comprising:
program instructions to construct a placeholder MAC field in the attribute frame, and to store the first MAC iteratively calculated by and received from the cryptographic coprocessor in the constructed placeholder MAC field.

4. The computer system of claim 1, further comprising:
program instructions to construct a placeholder cryptographic salt field in the attribute frame, to receive a cryptographic salt generated by the cryptographic coprocessor as an input for calculating the first MAC from the cryptographic coprocessor in response to transmitting the first sequence of attributes, and to store the cryptographic salt in the placeholder cryptographic salt field.

5. The computer system of claim 1, further comprising:
program instructions to serialize the first set of attributes and the second set of attributes into the first sequence of attributes according to a normalization scheme, and
program instructions to transmit the one or more attributes from the first sequence of attributes to the cryptographic coprocessor according to their order within the first sequence of attributes.

6. The computer system of claim 5, wherein the normalization scheme is dependent upon properties of the one or more attributes being serialized, the properties being selected from the group consisting of attribute values and attribute types.

7. The computer system of claim 1, wherein the program instructions to verify the attribute frame by comparing the first MAC or a value derived from the first MAC to a reference value comprises:
program instructions to transmit again the first sequence of attributes from the attribute frame to the cryptographic coprocessor;
program instructions to calculate a first cryptographic hash from the first MAC;
in response to transmitting again the first sequence of attributes, program instructions to receive from the cryptographic coprocessor a second cryptographic hash as the reference value; and
program instructions to compare the first cryptographic hash to the second cryptographic hash in order to verify the attribute frame.

8. The computer system of claim 7, further comprising:
program instructions to transmit again the key identifier to the cryptographic coprocessor;
in response to transmitting the key identifier, program instructions to receive a third set of attributes from the cryptographic coprocessor, wherein one or more attributes in the third set of attributes are associated with the cryptographic key and originating from the key attribute storage of the cryptographic coprocessor; and program instructions to validate that a subset of attributes from the first sequence of attributes conforms to the third set of attributes, and, if validation of the subset is not successful, stopping verification of the attribute frame.

9. A computer program product for operating a key management system, the computer program product comprising a computer readable storage medium having program instructions embodied therewith, the program instructions executable by a processor to cause the processor to:
transmit a key identifier that identifies a cryptographic key to a cryptographic coprocessor;
in response to transmitting the key identifier, receive a first set of attributes from the cryptographic coprocessor, wherein one or more attributes in the first set of attributes are associated with the cryptographic key and originating from a key attribute storage of the cryptographic coprocessor;
serialize the first set of attributes and a second set of attributes into a first sequence of attributes; store the first sequence of attributes within an attribute frame, wherein one or more attributes in the second set of attributes are associated with the cryptographic key, said one or more attributes in the second set of attributes originating from a key attribute storage of the key management system, and the second set of attributes being different from the first set of attributes;
transmit the first sequence of attributes from the attribute frame to the cryptographic coprocessor;
in response to transmitting the first sequence of attributes, receive from the cryptographic coprocessor a first MAC calculated from the first sequence of attributes; and
verify the attribute frame by comparing the first MAC or a value derived from the first MAC to a reference value.

10. The computer program product of claim 9, the program instructions being further configured to transmit the one or more attributes from the first sequence of attributes to the cryptographic coprocessor in consecutive calls in order to cause the cryptographic coprocessor to iteratively calculate the first MAC.

11. The computer program product of claim 9, the program instructions further being configured to construct a placeholder MAC field in the attribute frame, and to store the first MAC iteratively calculated by and received from the cryptographic coprocessor in the constructed placeholder MAC field.

12. The computer program product of claim 9, the program instructions further being configured to construct a placeholder cryptographic salt field in the attribute frame, to receive a cryptographic salt generated by the cryptographic coprocessor as an input for calculating the first MAC from the cryptographic coprocessor in response to transmitting the first sequence of attributes, and to store the cryptographic salt in the placeholder cryptographic salt field.

13. A method for operating a key management system, the method comprising:
transmitting a key identifier that identifies a cryptographic key to a cryptographic coprocessor;
in response to transmitting the key identifier, receiving a first set of attributes from the cryptographic coprocessor, wherein one or more attributes in the first set of attributes are associated with the cryptographic key and originating from a key attribute storage of the cryptographic coprocessor;
serializing the first set of attributes and a second set of attributes into a first sequence of attributes;

storing the first sequence of attributes within a attribute frame, wherein one or more attributes from the second set of attributes are associated with the cryptographic key, said one or more attributes in the second set of attributes originating from a key attribute storage of the key management system, and the second set of attributes being different from the first set of attributes;
transmitting the first sequence of attributes from the attribute frame to the cryptographic coprocessor;
in response to transmitting the first sequence of attributes, receiving from the cryptographic coprocessor a first MAC calculated from the first sequence of attributes; and
verifying the attribute frame by comparing the first MAC or a value derived from the first MAC to a reference value.

14. The method of according to claim 13, the method being further configured to transmit the one or more attributes from the first sequence of attributes to the cryptographic coprocessor in consecutive calls in order to cause the cryptographic coprocessor to iteratively calculate the first MAC.

15. The method of according to claim 13, the method further being configured to construct a placeholder MAC field in the attribute frame, and to store the first MAC iteratively calculated by and received from the cryptographic coprocessor in the constructed placeholder MAC field.

16. The method of according to claim 13, the method further being configured to construct a placeholder cryptographic salt field in the attribute frame, to receive a cryptographic salt generated by the cryptographic coprocessor as an input for calculating the first MAC from the cryptographic coprocessor in response to transmitting the first sequence of attributes, and to store the cryptographic salt in the placeholder cryptographic salt field.

17. The method of according to claim 13, the method further being configured to serialize the first set of attributes and the second set of attributes into the first sequence of attributes according to a normalization scheme, and to transmit the one or more attributes from the first sequence of attributes to the cryptographic coprocessor according to their order within the sequence of attributes.

18. The method of according to claim 17, the normalization scheme being dependent upon properties of the one or more attributes being serialized, the properties being selected from the group consisting of attribute values and attribute types.

19. The method of according to claim 13, wherein verifying the attribute frame comprises:
transmitting again the first sequence of attributes from the attribute frame to the cryptographic coprocessor;
calculating a first cryptographic hash from the first MAC;
in response to transmitting again the first sequence of attributes, receiving from the cryptographic coprocessor a second cryptographic hash as the reference value; and
comparing the first cryptographic hash to the second cryptographic hash in order to verify the attribute frame.

20. The method of according to claim 19, wherein verifying the attribute frame further comprises:
transmitting again the key identifier to the cryptographic coprocessor;
in response to transmitting the key identifier, receiving a third set of attributes from the cryptographic coprocessor, wherein one or more attributes in the third set of attributes are associated with the cryptographic key and originating from the key attribute storage of the cryptographic coprocessor; and validating that a subset of attributes from the first sequence of attributes conforms to the third set of attributes, and, if validation of the subset is not successful, stopping verification of the attribute frame.

* * * * *